(No Model.) 6 Sheets—Sheet 1.

W. HEISER & G. J. MEYER.
SPRINKLING DEVICE FOR PNEUMATIC MALTING MACHINES.

No. 590,546. Patented Sept. 21, 1897.

Witnesses:
Julian Stark.
Al. Stark.

Inventors:
William Heiser,
by George J. Meyer.
Michael J. Stark & Son, Attorneys.

(No Model.) 6 Sheets—Sheet 3.

W. HEISER & G. J. MEYER.
SPRINKLING DEVICE FOR PNEUMATIC MALTING MACHINES.

No. 590,546. Patented Sept. 21, 1897.

Witnesses:
Julian Stark
Al. Stark.

Inventors:
William Heiser,
George J. Meyer
by Michael J. Stark & Sons, Attorneys.

(No Model.) 6 Sheets—Sheet 4.

W. HEISER & G. J. MEYER.
SPRINKLING DEVICE FOR PNEUMATIC MALTING MACHINES.

No. 590,546. Patented Sept. 21, 1897.

Witnesses: Julian Stark, Al. Stark.

Inventors: William Heiser, George J. Meyer, by Michael J. Stark & Sons, Attorneys.

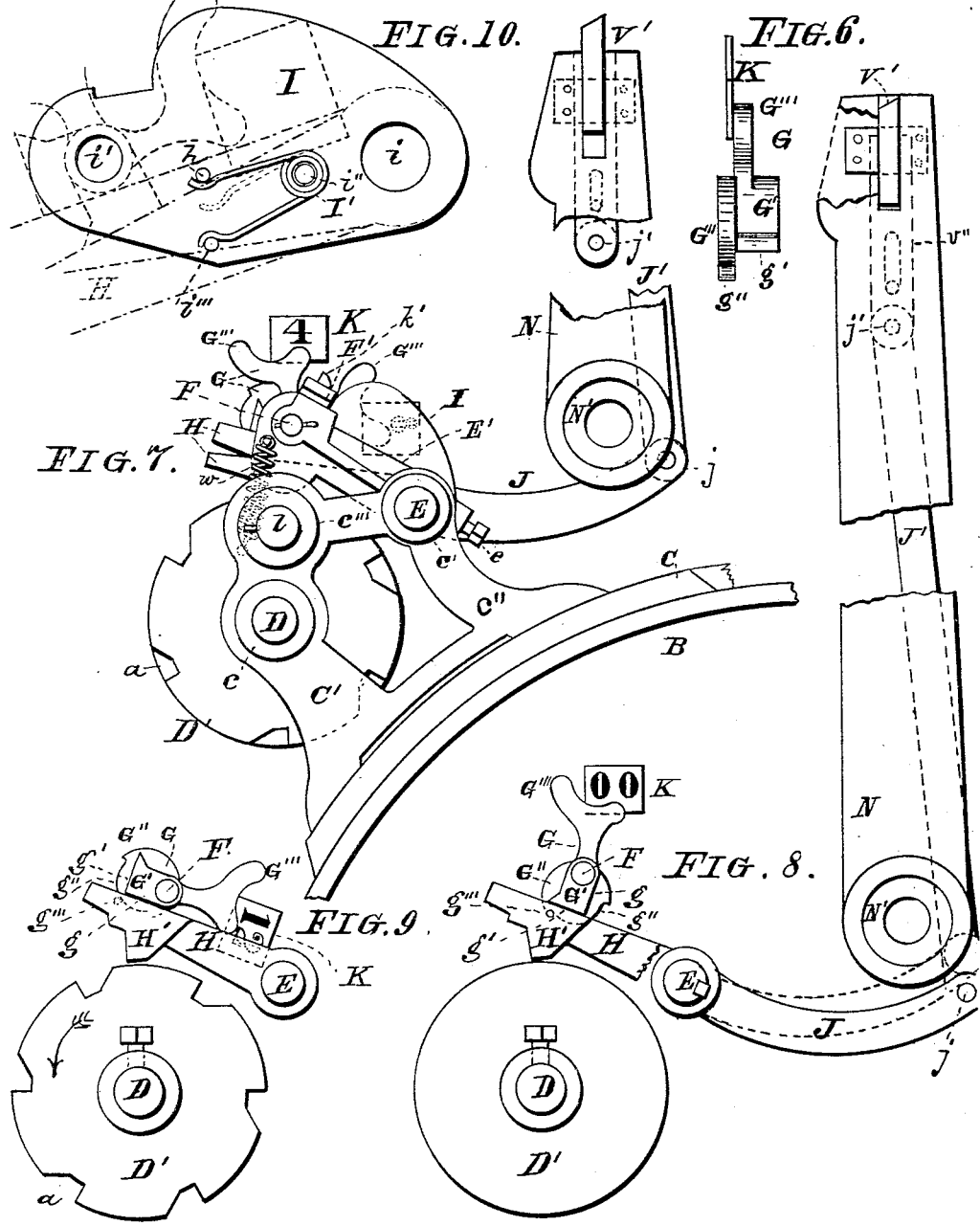

(No Model.) 6 Sheets—Sheet 6.
W. HEISER & G. J. MEYER.
SPRINKLING DEVICE FOR PNEUMATIC MALTING MACHINES.
No. 590,546. Patented Sept. 21, 1897.
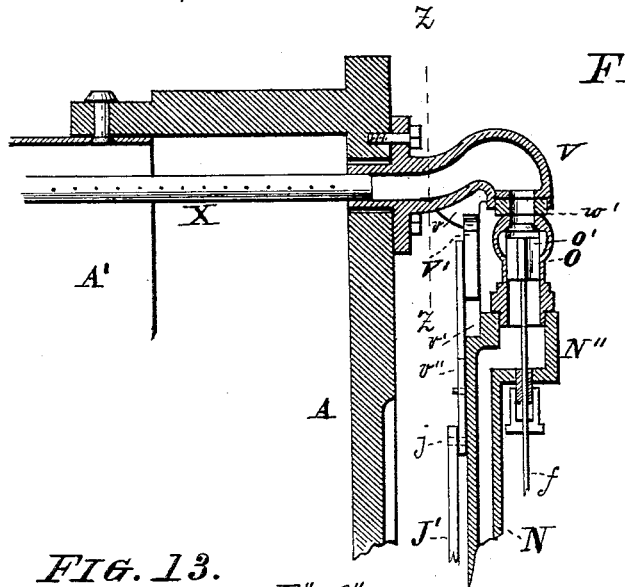
FIG. 11.
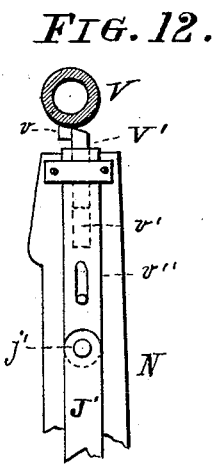
FIG. 12.
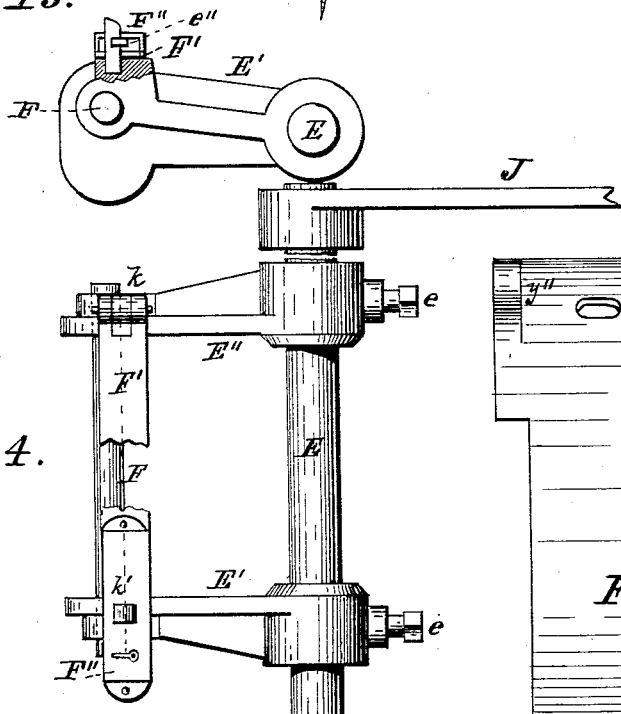
FIG. 13.
FIG. 14.
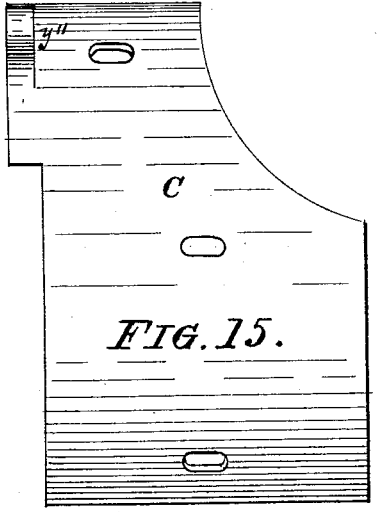
FIG. 15.
Witnesses:
Julian Stark
Al Stark
Inventors:
William Heiser,
George J. Meyer,
by Michael J. Stark & Sons, Attorneys.

UNITED STATES PATENT OFFICE.

WILLIAM HEISER AND GEORGE J. MEYER, OF BUFFALO, NEW YORK.

SPRINKLING DEVICE FOR PNEUMATIC MALTING-MACHINES.

SPECIFICATION forming part of Letters Patent No. 590,546, dated September 21, 1897.

Application filed January 6, 1897. Serial No. 618,180. (No model.)

*To all whom it may concern:*

Be it known that we, WILLIAM HEISER and GEORGE J. MEYER, citizens of the United States, residing at Buffalo, in the county of Erie and State of New York, have invented certain new and useful Improvements in Sprinkling Devices for Pneumatic Malting-Machines; and we do hereby declare that the following description of our said invention, taken in connection with the accompanying sheets of drawings, forms a full, clear, and exact specification, which will enable others skilled in the art to which it appertains to make and use the same.

This invention has general reference to sprinkling devices for pneumatic malting-drums; and it consists, essentially, in the novel and peculiar combination of parts and details of construction, as hereinafter first fully set forth and described, and then pointed out in the claims.

Figure 1:
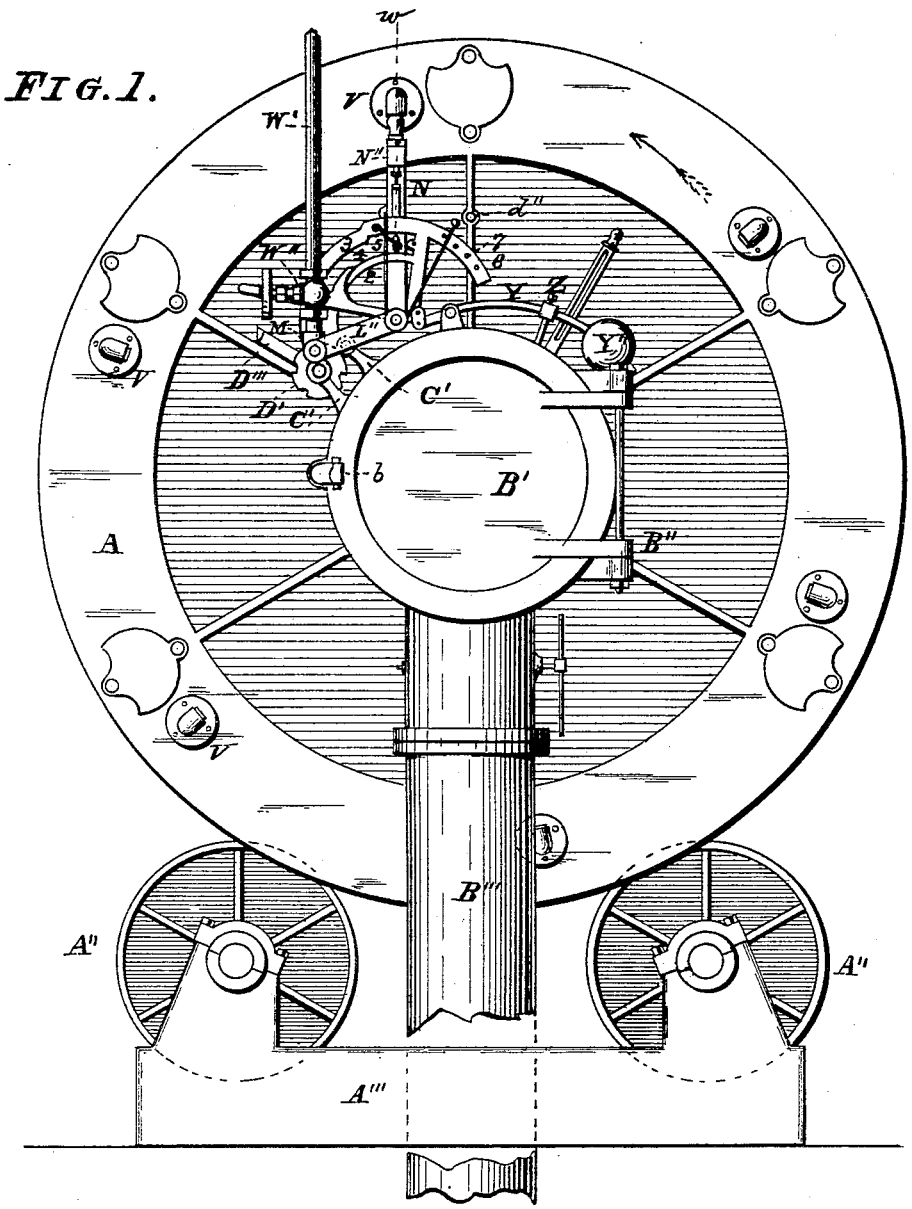
Figure 2:
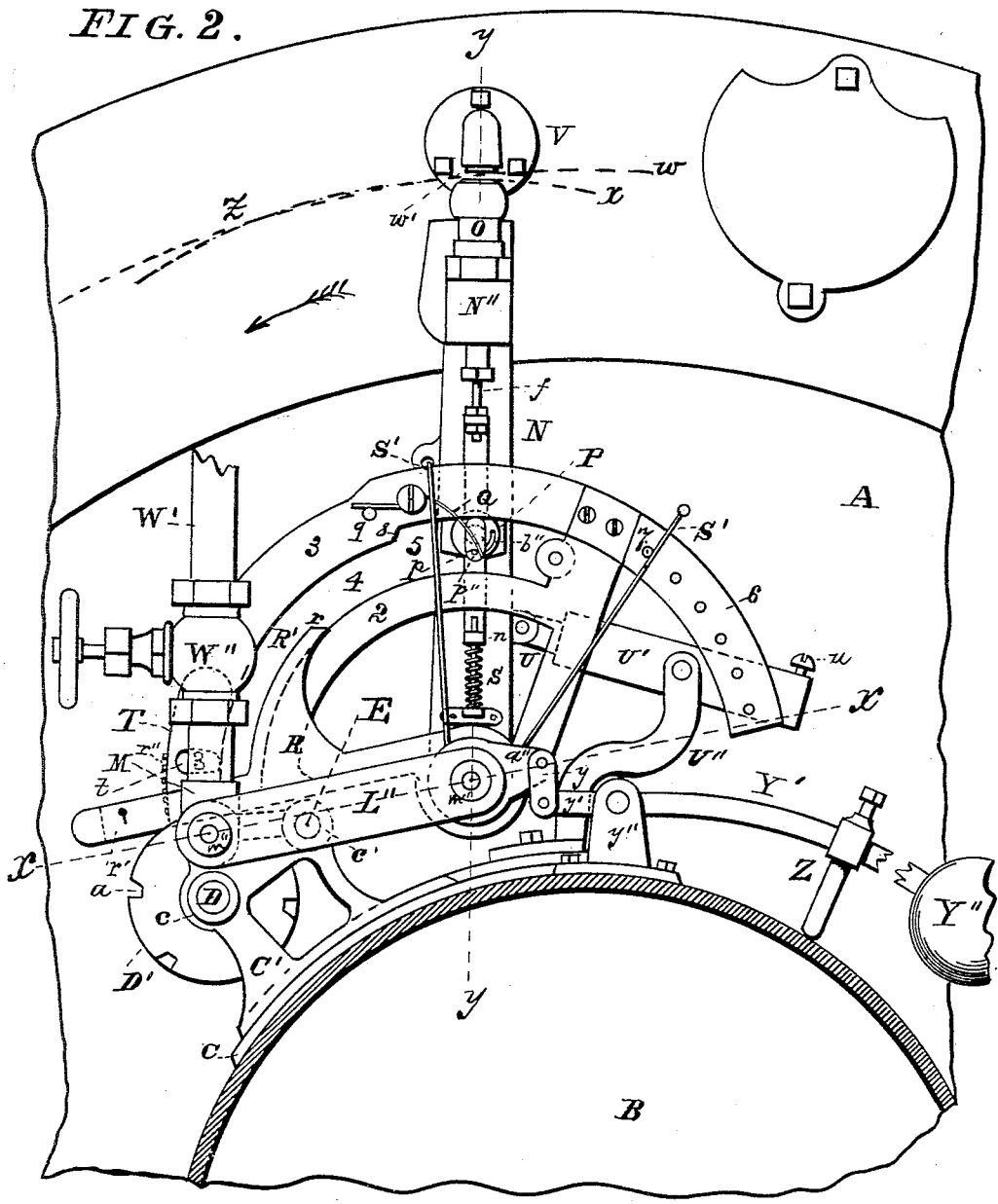
Figure 3:
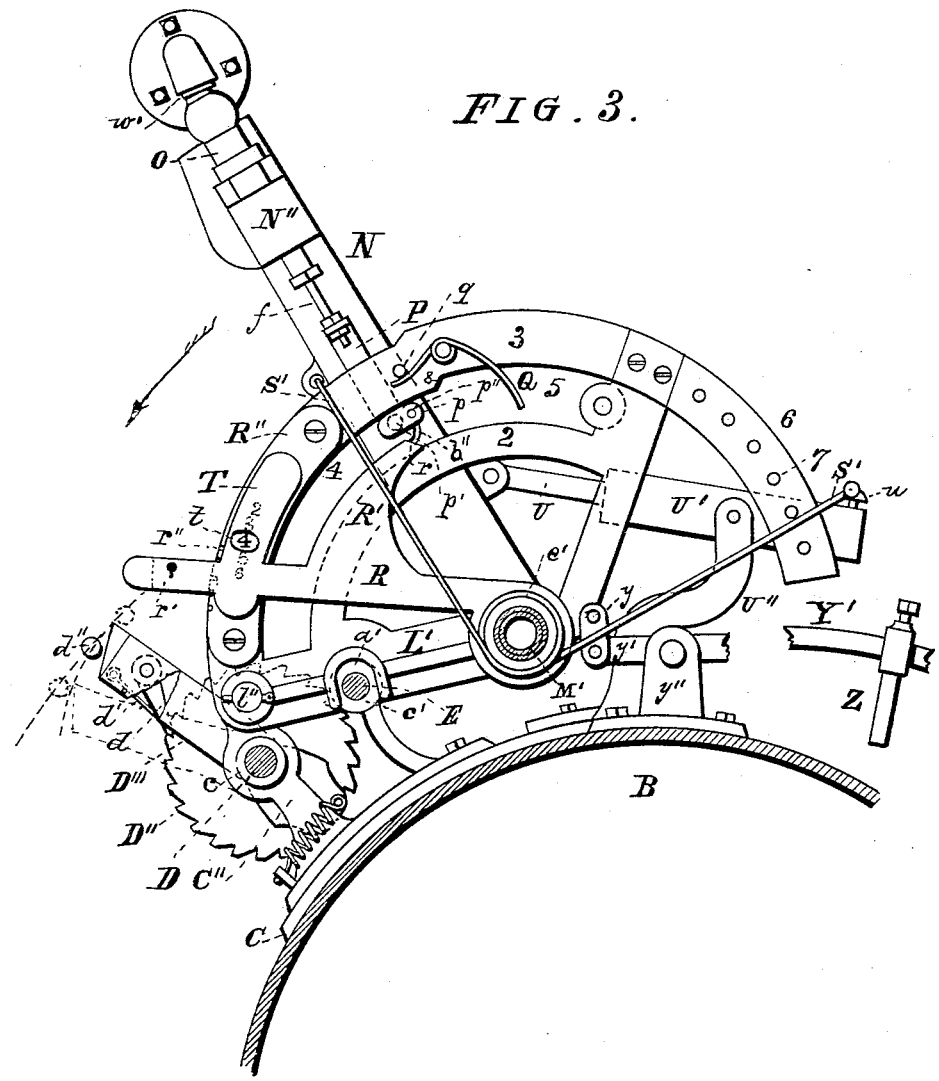
Figure 4:
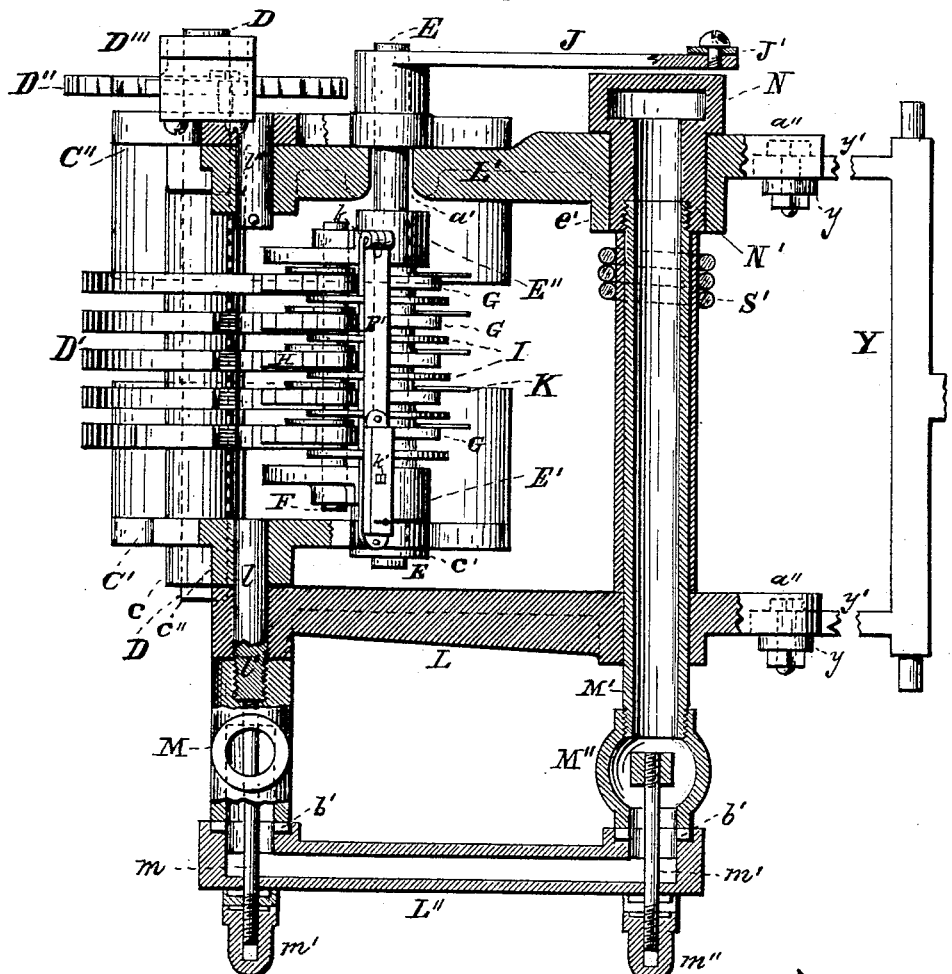
Figure 5:
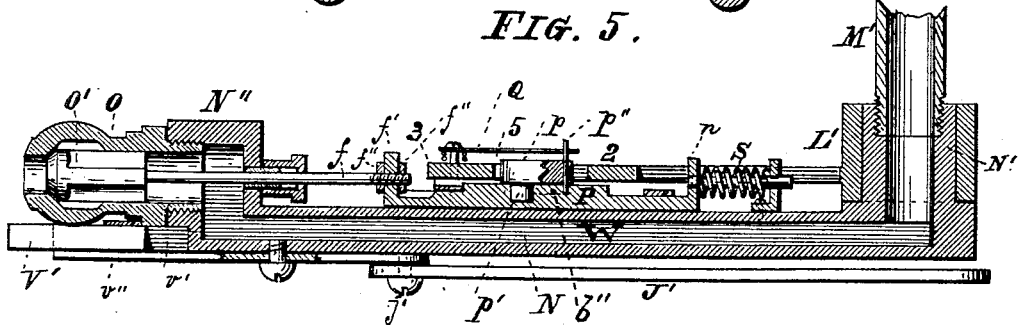

In the drawings already referred to, which serve to illustrate our said invention more fully, Figure 1 is an end elevation of a pneumatic malting apparatus provided with the improved sprinkling device. Fig. 2 is a similar view of the sprinkling mechanism drawn to a larger scale and showing the sprinkler-arm in position to make contact with one of the connections or goosenecks on the drum. Fig. 3 is a similar view showing the sprinkler mechanism at the point slightly in advance of the position where said sprinkler-arm breaks contact with said gooseneck. Fig. 4 is a plan of a portion of the sprinkler mechanism, part of which is shown in section in line $x\,x$ of Fig. 2. Fig. 5 is a longitudinal sectional elevation of the swinging arm in line $y\,y$ of Fig. 2. Fig. 6 is a side elevation of one of the lifting-cams for the mechanism actuating the catch on the swinging arm which engages the gooseneck on the drum. Fig. 7 is an elevation of a portion of the sprinkling mechanism, illustrating the position of those parts that operate to throw the catch on the swinging arm upward for engagement with the said gooseneck, while Figs. 8 and 9 are detail views of a portion of this mechanism, showing the catch on the swinging arm withdrawn to prevent engagement with the said gooseneck. Fig. 10 is a plan of one of the separating-plates, showing the position of the dog-spring relative to the dog. Fig. 11 is a transverse sectional elevation in line $w\,w$ of Fig. 1 of a portion of the drum and its swinging arm. Fig. 12 is a rear elevation of the upper portion of the swinging arm and gooseneck, showing contact with each other. Fig. 13 is a side view of one of the two arms of the mechanism actuating the catch on the swinging arm; and Fig. 14 is a plan of the two arms, their shafts, and the arm that operates said catch. Fig. 15 is a plan of the bed-plate upon which the sprinkling mechanism is affixed.

Like parts are designated by corresponding letters and numerals of reference in all the various figures.

The object of this invention is the production of an automatically and intermittently operating sprinkling mechanism for pneumatic malting-drums that shall perform its functions with the utmost precision and shall be durable and serviceable in operation. It is applicable to any and all the various constructions of pneumatic malting-drums now in use. These drums are usually large cylinders of about six feet in diameter and about twenty feet in length and contain the grain to be treated. They are revolved at a very slow rate—say one revolution in about from fifteen to thirty minutes. While the drum is thus revolved the grain is moistened by a sprinkling device and air is passed through the grain, so as to cause it to grow, the proper sprinkling or moistening of the grain being one of the most essential requisites to the successful production of malt, and which by the present invention is effected in the most thorough manner.

A in the drawings is the head or end plate, and A', Fig. 11, the shell or cylinder, of a malting-drum; A'', Fig. 1, the wheels, and A''' the base with its bearings for said wheels. This drum has centrally a pipe B, closed by a door B', hinged to the end pipe at B'' and locked by a button $b$, as illustrated in Fig. 1, said pipe B having a branch B''', leading to the usual exhaust-fan (not shown) employed to draw air through the drum.

Upon the pipe B is located a base-plate C, (shown in plan in Fig. 15,) to which are attached two standards C' C'', Figs. 4 and 7, having each three bosses $c\,c'\,c''$, respectively, forming bearings, of which $c'$ receives a shaft D, upon which and between the standards C' C'' are mounted a series of disks D', while outside of the standard C'' there is located a ratchet-wheel D'' and a ratchet-lever D''', having a pawl $d$, Fig. 3, engaging said ratchet-wheel D'' by a spring $d'$ in the usual manner.

One end of the drum A has an engaging pin $d''$, Figs. 1 and 3, which while the drum revolves moves the ratchet-lever D''', so as to cause the rotation of the ratchet-wheel D'' the distance of one tooth, there being twenty-four (more or less) teeth in said ratchet-wheel, so that the latter makes but one revolution to twenty-four of the malting-drum. There are five (more or less) of the disks D' upon the shaft D, and of these all but the last one have notches $a$, varying in number, the first disk having six and the others, respectively, three, two, and one of these notches, the object of which will hereinafter be referred to.

In the bosses $c'$, Fig. 7, there is journaled a shaft E, upon which are secured two arms E' E'', Figs. 7 and 14, by set-screws $e$, said arms being provided with a fixed shaft F on their forward end, upon which are located a series of lifting-cams G, Figs. 4, 7, 8, and 9, acting upon a series of dogs H, journaled upon the shaft E in a manner hereinafter to be described, there being placed between the dogs a series of separating-plates I. (Shown in detail in Fig. 10.) These plates have holes $i$ for the passage of shaft E and further holes $i'$ to receive the fixed shaft F, there being on said plates studs $i''$, around which are placed coil-springs I', one arm of which bears upon a stop-pin $i'''$ on said separating-plate I and the other arm upon a stop-pin $h$ on the dog H, the action of these springs being to always keep the dogs H in contact with the lifting-cams G in a manner readily comprehended.

The dogs H have each a V-shaped projection H', Figs. 8 and 9, adapted to engage the notches $a$ in the respective disks D' whenever one of said dogs is depressed by the respective lifting-cam G, or, rather, whenever the arms E' E'', with the fixed shaft F and the lifting-cams G, are elevated at their outer end by turning one of the lifting-cams into a vertical position to cause a partial revolution of the shaft E, it being understood that these lifting-cams G have an oblong projection G', Figs. 6 and 9, the side $g$ of which bears upon the upper edge of the dog H when the lifting-cam is turned down, as shown in Fig. 9, and the end $g'$ of which bears upon said upper edge when the lifting-cam is turned up, as depicted in Fig. 8, the upward movement of the shaft F and the lifting-dogs thereon being equal to the difference between the distance from the center of the shaft F to the side $g$ and the end $g'$ of said oblong projection on the lifting-cams G, respectively. The lifting-cams G have, furthermore, disks G', Fig. 8, provided with segmental excisions $g''$, engaging pins $g'''$, to limit the revolution of the lifting-cams G upon the shaft F. On the opposite ends of these lifting-cams there are convenient handles G''' and indicating-plates K, the object of which will also later on appear.

In the boss $c''$ of the standard C', Fig. 4, there is affixed a stud $l$, having its forward end screw-threaded at $l'$ to receive a T M, by means of which is retained in position a lever L, while in the boss $c''$ of the standard C'' there is a further stud $l''$, upon which is journaled a quadrant L', (shown in detail in Figs. 2 and 3,) the lower part of which is shaped substantially like the lever L, except that it has a curved excision $a'$, Figs. 3 and 4, for the passage of the shaft E. This lever L has near its outer end an aperture for the passage of a tube M' and it terminates in an eye $a''$.

The lower portion of the quadrant L' is, as stated, constructed like the lever L—i. e., it terminates in an eye $a''$—and it has near its end an aperture for the passage of the journal N' of a swinging arm N, said journal N' being internally screw-threaded, as shown in Fig. 4, to receive one end of the pipe M', the opposite end of which is secured in a socket M'', which socket is connected with the T M by a link L'', which is retained in position by screw-rods $m\ m'$, having on their outer ends nuts $m''$. Elastic washers $b'$ are interposed between the T M and socket M'' and the link L'', respectively, to produce a movable but tight joint between these parts.

The quadrant L' has the segmental members 2 and 3, Figs. 2 and 3, to produce between them a curved opening 4, having at its end an enlargement 5, the upper segmental member 3 being continued at 6 and provided with a series of pins 7, as hereinafter described.

The swinging arm N, Figs. 2 and 3, is located behind the quadrant L' and in close contact therewith. Upon its face and near its upper end it has an angular projection or boss N'', Fig. 11, into which is screwed a valve-casing O. About midway of its length it carries a slide P, in the center of which is located an oblong dog $p$, having a pivot $p'$, Figs. 2, 3, and 5, of a width equal to that of its body, but not located in the center thereof, but nearer to its upper end. In the lower end of this oblong dog there is a pin $p''$, projecting therefrom on both sides, its lower end entering a segmental slot $b''$, Fig. 2, to limit its revolution to one-fourth of a turn and its upper end engaging a spring Q, secured with one end to the member 3 of the quadrant L' and resting with one end against a pin $q$ thereon. This oblong dog is so disposed upon the swinging arm N that when it is in a vertical position, as shown in Fig. 2, it nearly reaches with its upper curved edge to the upper edge of the enlargement 5, but when the swinging arm N moves to the left and the oblong dog passes the incline 8 on the member 3 of the quadrant it causes the slide to be moved downwardly. This slide is connected with a valve O' in the valve-chamber O by a rod $f$, passing through a lug $f''$ on the slide P and having adjusting-nuts $f'''$ on either side of the lug $f$ to enable the valve O' being properly adjusted.

Upon the boss $e'$, Fig. 3, of the quadrant L', within which the swinging arm rotates, is placed a stop-lever R, having a curved portion R', engaging the curved opening 4 in the quadrant, the end $r$ of which is beveled, as shown in Figs. 2 and 3. When the oblong dog $p$ in its movement toward the left passes this beveled part $r$, it is revolved one-fourth of a revolution, the spiral spring S, Figs. 2 and 5, upon the face of the swinging arm acting upon a lug $n$ on the slide P, assisting in throwing the oblong dog over, and at the same time keeping the valve shut, Fig. 5.

When the swinging arm N has completed its movement to the left, it is returned to its normal vertical position by a coil-spring S', Fig. 4, wound around a jacket upon the pipe M' and engaging with one of its arms, Figs. 3 and 4, the swinging arm N and with its other arm one of the series of pins 7, Fig. 2, on the segmental portion 6 of the quadrant, said spring being adjusted for tension by its respective arm being placed behind said pins 7 nearer to or farther away from the swinging arm N. When in returning the swinging arm N approaches its normal position, the pin $p''$ on the oblong dog $p$ comes in contact with the curved free end of the spring Q, which acts, as it were, as an elastic or yielding abutment and causes the return of the oblong dog $p$ to its normal vertical position, (shown in Fig. 2,) said spring Q being preferable to a fixed non-yielding abutment because it prevents breakage of the pin $p''$ and other disarrangement of the parts connected with said oblong dog.

In order to adjust the distance which the swinging arm moves before the oblong dog $p$ is thrown, the cam-lever R is revolved around the boss $e'$, so as to bring the incline $r$ nearer to or farther away from the incline 8 of the member 3, and this lever R is locked in position by a lock $r'$ on its end, the bolt of which (not shown) engages one of a series of notches $r'''$ in the edge of a curved plate R'', fastened to the face of the member 3 and provided with engraved ordinals "2," "3," "4," "5," and "6" to approximately indicate the number of inches which the extreme end of the swinging arm travels from the time that the oblong dog has passed the incline 8 to the time that it is thrown by the incline $r$, said ordinals being covered by an extension T on the cam-lever R and having an opening $t$ in its face, through which the respective ordinal may be observed.

The cam-lever R is thus locked by a key inserted through the keyhole (shown in Figs. 2 and 3) to prevent accidental or mischievous interference with said cam-lever R.

To prevent the swinging arm from being returned suddenly by the spring S', Fig. 2, there is connected with it a piston U, operating in an air-compression cylinder U', suspended in a yoke U'' and having its ingress and escape opening controlled by an adjusting-screw $u$ in the well-known manner.

Upon the face of the head A of the drum there is located a series of connections or goosenecks V, having on their under side a projection $v$, Figs. 11 and 12, wherewith engages a movable catch V', located in a slot $v'$ on the upper end of the swinging arm N. This catch is fastened to a strip $v''$, which in turn connects with one end of a connecting-rod J' by a bolt $j'$ and the other end of which is connected with a curved arm J, fastened to the end of the shaft E by a bolt or pin $j$, Fig. 8. It will now be observed that when this arm J is depressed it will pull down the catch V' and thereby allow the goosenecks V to pass the upper end of the swinging arm, while when said arm J is raised and thereby the catch projected it will engage the projection $v$ on the gooseneck and thereby connect the swinging arm with it and move it along. But to limit the distance which the swinging arm and the gooseneck move together the bolt $j$ in the curved lever J, Fig. 7, is located below and to one side of the center of motion of the swinging arm, as shown in Figs. 7 and 8, so that when the said swinging arm moves toward the left the catch V' will be gradually pulled down until it is sufficiently retracted to disengage itself from the projection $v$, and then the swinging arm is free to return to its normal position. It will now be further observed that if the arm J were always retained in the position shown in Fig. 7—i. e., in a raised position—engagement with the gooseneck and swinging arm would be effected every time that a gooseneck reaches the swinging arm. This, however, is not desirable, and to cause this engagement to be an intermittent one the mechanism consisting of the ratchet-wheel, the notched disks, the dogs, and the lifting-cams and their appurtenants are resorted to to operate in the following manner:

The engaging pin $d''$, Fig. 3, on the head of the drum operates the ratchet-lever, and this in turn causes the ratchet-wheel D'' and the notched disks D' to make one complete revolution to every twenty-four revolutions of the drum. When the lifting-cams are all turned down in the position shown in Fig. 9, the V-shaped projection H' on the dog H above the smooth disk D' will ride upon the periphery of the latter and thus keep the arm J in its raised position. In this position the engagement of the swinging arm and gooseneck will take place every time that a gooseneck reaches the swinging arm. If now the lifting-cam G above the disk D' having, say, six notches $a$ be turned up, the arm J will be depressed and kept in its depressed condition (shown in Fig. 8) until one of the notches $a$ reaches a point where the projection H' can drop into it, when the end of said arm J will rise and throw the catch V' up to make engagement with every one of the series of goosenecks during one revolution of the drum, when the engaging pin $d''$ will move the ratchet-wheel $D''$ one tooth and thus revolve the disk $D'$ having the six notches $a$ the space of one notch and thereby lift the dog $H$ so that its V-shaped projection $H'$ rides upon the smooth portion of the notched disk between the notches until its next succeeding notch enables it to again drop and thereby to repeat the operation of the swinging arm, as described. To assist the dog $H$ in dropping into the notches $a$, a spiral spring $w$, Fig. 7, is connected with the arm $E'$ and the standard $C'$, which will pull down the arms $E' E''$ with all the dogs and cam-levers mounted upon their shafts. It will thus be seen that by the employment of the disk having six notches engagement between the goosenecks and the swinging arm takes place every fourth revolution of the malting-drum, while with the remaining disks this engagement takes place, respectively, with every sixth, eighth, or twelfth revolution thereof. On the other hand, if the cam-lever $G$ opposite the blank disk $D'$ is elevated the curved arm $J$ will be depressed and remain depressed, so that no engagement between the goosenecks and the swinging arm can take place while the malting-drum is revolving.

Having now described the operation of the swinging arm, we will state the object of this device.

The swinging arm $N$, Fig. 5, is hollow, having an internal passage $W$ to communicate with the valve-chamber $O$ through the angular projection $N''$. The journal $N'$ of the swinging arm is likewise hollow, as is also the connecting-link $L''$, Fig. 2, so that a complete passage from the T M to the valve-chamber $O$ is established. The T M has a supply-pipe $W'$ and a stop-valve $W''$, Figs. 1 and 2, through which water from any convenient source is admitted, and when the stop-valve $W''$ is opened a continuous supply is passed to the valve-chamber, from which it is prevented from escaping by the valve $O'$, but is permitted to escape when the swinging arm has made connection with the gooseneck (see Fig. 11) and the valve $O'$ has been opened in the manner already described. Each of the goosenecks is provided with a perforated pipe $X$ in the interior of the drum, Fig. 11, through which the water escapes and sprinkles the grain in the interior of the drum whenever the swinging arm connects with the gooseneck and the valve $O'$ is opened.

The centers of revolution of the swinging arm and the malting-drum on which the goosenecks are attached do not coincide, and hence the arcs described by the extreme end of said swinging arm and the goosenecks are different. The relative positions of these two centers is such that said arcs pass through each other, as shown in dotted lines in Fig. 2, $x$ being the arc described by the swinging arm and $w$ that of the goosenecks. When the gooseneck $V$ is in line with the swinging arm and connected therewith, the upper end of the swinging arm is not in contact with the gooseneck; but they will be in contact before the oblong dog $P$ reaches the incline $S$ to open the valve $O'$, and they will be so kept in contact notwithstanding the fact that they move in different arcs by the following device: To the eyes $a''$ of the levers $L' L''$ are attached links $y$, which in turn connect with the arms $y'$ of a U-shaped lever $Y$, journaled in bearings $y''$. This lever has an arm $Y'$, which is provided with a movable weight $Y''$, and a stop $Z$, which latter contacts with the pipe $B$ when in its normal position. The arm $Y'$ is curved to a greater radius than the pipe $B$, so that by moving the stop $Z$ away from or toward the fulcrum of the lever $Y$ this arm may drop or rise somewhat. This weight acts upon the swinging arm $N$ in such a manner that it enables its upper end to follow the arc of the gooseneck $V$ and exert an even and sufficient pressure upon an elastic washer $w'$, placed into the ends of the goosenecks $V$, and thus preserve a tight joint between the valve-casing and the gooseneck as long as they are in contact.

In order to prevent accidental or mischievous interference with the lifting-cams $G$, there is located on the top of the arms $E' E$, Fig. 4, a bar or latch $F'$, hinged to the arm $E'$ at $k$ and passing over a stud $k'$ on the arm $E'$. The outer end of this bar $F'$ carries a lock $F''$, the bolt $e''$, Fig. 13, of which engages a notch in the stud $k'$ and thus locks the bar $F'$. This bar passes in front respectively to the rear of the handles $G'''$ and prevents the upturned cam-lever from being turned down and the turned-down cam-levers from being turned up. The indicator-plates on these cam-levers are engraved with the numerals "4," "6," "8," "12," and "00," indicating the respective notched disk $D'$ which it is desired to engage and the numeral of which is in plain view, while all the indicating-plates $K$ that are turned down are hidden from view by the separating-plates $I$, as clearly illustrated in Fig. 7.

In Figs. 1 and 2 of the drawings the arm $E'$ with the dogs and lifting-cams are omitted to prevent crowding of the parts, they being clearly shown in the remaining figures.

In now describing the operation of this sprinkling device it will be well to bear in mind that no matter at what intervals of time this sprinkling takes place there is never more than one of the disks $D'$, dogs $H$, and their respective lifting-cams $G$ in actual operation, all others remaining inactive, although all the disks $D'$ are secured to a common shaft $D$. We further call attention to the fact that the interval between the respective sprinklings is changed by bringing into service that one of the dogs and lifting-cams which coacts with the respective disk $D'$ having the proper number of notches $a$ to produce the desired result. These disks, of which there are five in the present instance, but the number of which may be varied without changing the essential features of this machine, are arranged in the following order: first, a disk without any notches, then one having two of the notches $a$, while the following disks have, respectively, three, four, and six notches, (it being understood that disks with a different arrangement of the number of notches may be used without departing from our invention,) whereby sprinkling may be effected with every twelfth, eighth, sixth, and fourth revolution of the malting-drum, and by using the disk without notches to either sprinkle continuously or not at all, as the case may be. We have already stated that the duration or length of time of each sprinkling is regulated by the cam-lever R, the beveled end $r$ of which throws the oblong dog over and closes the valve in the swinging arm and thus shuts off the water-supply, so that in describing the operation no reference to this feature of changeability of the duration of sprinkling is made.

Assuming now that sprinkling is to take place continuously, as it will be in the early stage of malting when the grain is to be thoroughly wetted. To accomplish this, all the dogs G are thrown down, which causes the ends of the arms E′ E″, Fig. 14, to drop and the end of the arm J to rise and the catch V′ of the swinging arm N to project therefrom. Now this swinging arm N will be engaged by every gooseneck with which it comes in contact and travel with it until released and returned by the mechanism already described. While thus sprinkling continuously the disks D′ and their dogs and lifting-cams take no active part in the operation further than that the nose or V-shaped projection H′ of the smooth disk rests upon its smooth periphery and thereby prevents the V-shaped projections engaging any one of the notches in the several notched disks. The same result would be secured by making the engaging pin $d″$ on the malting-drum removable, so that the ratchet-lever would not be moved.

When it is desired to sprinkle intermittently—i. e., once for every certain number of revolutions of the malting-drum—then the disk D′ having the requisite number of notches $a$ and its respective dog and cam-lever are brought into action.

Assuming now that sprinkling is to take place every fourth revolution of the malting-drum, the dog H, with its lifting-cam G opposite the disk D′ having six notches, is brought into action by lifting the respective lifting-cam G, it being further assumed that the disk D′ is in a position shown in Fig. 9, with the V-shaped projection H′ riding upon the smooth portion of the periphery of said disk D′. The engaging pin $d″$ in coming in contact with the ratchet-lever D‴ moves the latter, and this in turn the ratchet-wheel D″ (the space of one tooth) and also the notched disk D′, until on the fourth revolution of the malting-drum a notch $a$ is in position for the V-shaped projection H′ to drop into it and thereby allow the ends of the arms E′ E″ to drop and the end of the arm J to rise and thereby to project the catch V′ from the swinging arm N, when every gooseneck on the malting-drum will engage the swinging arm and thus cause sprinkling to take place during one revolution of the said malting-drum, when, with the next revolution, the engaging pin $d″$ will move the disk D′ the space of the respective notch, and in so doing raise the dog H and thereby return the arms E′ E″ and the curved arm J to their original position to prevent engagement of the swinging arm with the said goosenecks until after the next four revolutions of the malting-drum the next succeeding notch $a$ in the six-notch disk D′ is in position for the V-shaped projection H′ to drop into it and thus to repeat the operation of sprinkling. There being twenty-four teeth in the ratchet-wheel and but six notches in the disk D′ just described, it is evident that the ratchet-wheel moves four teeth before the disk D′ has moved the distance from one notch $a$ to the next succeeding one, so that it will now be readily understood that where the disk having but one notch brought into action the malting-drum would have to make twenty-four revolutions before a notch would be in position for the V-shaped projection H′ of the respective dog to drop into it.

In Fig. 9 the lifting-cam G is shown as turned down, as it would be when the plain disk D′ (shown in Fig. 8) is in operative action, to prevent sprinkling taking place, the end of the curved arm J being depressed and the catch V′ retracted. It is obvious that to cause this six-notch disk D′ to be the one controlling the sprinkling its lifting-cam G must be turned up.

In this specification we have termed the parts G "lifting-cams," for the reason that when any one of them is turned up it will lift the end of the arms E′ E″ by its end $g′$ on the projection G′ bearing upon the upper surface of the dog H.

It will now be finally observed that by the construction of this automatically-acting intermittent sprinkling device it is possible to so time the number and duration of the sprinkling that the best possible results in the germinating process of the grain are attained and that the continually-required changes in the number and duration of the sprinklings may be instantly made by changing the lifting-cams as to the number and the position of the cam-lever as to the duration of said sprinklings, important results which will be fully recognized by all engaged in the production of malt.

Having thus fully described this invention, we claim as new and desire to secure to us by Letters Patent of the United States—

1. In a pneumatic malting apparatus, the combination, with the malting-drum, of sprinkling-pipes located therein, connections, such as goosenecks located on the head thereof, and means substantially as described, for automatically connecting a water-supply pipe with said connections for intermittent sprinkling as specified.

2. In a pneumatic malting apparatus, a malting-drum, sprinkling-pipes located therein, connections attached to the end of said drum, a water-supply pipe, means, substantially as described, for automatically connecting the water-supply pipe with said connections, means for automatically turning on and shutting off the water-supply, and means for automatically disconnecting the water-supply pipe from the connections, as specified.

3. In a pneumatic malting apparatus, a malting-drum, a series of connections, such as goosenecks on the head of said drum, a swinging pipe, means for automatically connecting said swinging pipe alternately with each connection, means for automatically turning on and shutting off the water in the swinging pipe, means for automatically disconnecting said swinging pipe from the connections, and means, substantially as described, for intermittently connecting the swinging arm with said connections at predetermined intervals, as stated.

4. In a pneumatic malting apparatus, a movable water-supply pipe, means for automatically connecting it with, and connections on the said drum, and means for changing the intervals between the various sprinklings, as specified.

5. In a pneumatic malting apparatus, a malting-drum, sprinkling-pipes located therein, a series of connections on the head of said drum, a water-supply, a hollow swinging arm, means for automatically connecting it with the said connections, means for automatically disconnecting the arm and connections, and a controlling-valve adapted to automatically open and close the water-supply while the swinging arm is in motion, as specified.

6. In a pneumatic malting apparatus, a revolving drum, sprinkling-pipes located therein, goosenecks on the end of said drum, a water-supply pipe, a hollow swinging arm, means for automatically engaging said swinging arm with the goosenecks, a controlling-valve on said swinging arm adapted to open and close the water-supply while the swinging arm is in engagement with the goosenecks, and means substantially as described, for automatically opening and closing said controlling-valve, as specified.

7. In a pneumatic malting apparatus, a revolving drum, a series of goosenecks on the head thereof, a water-supply pipe, a hollow swinging arm connected with said water-supply pipe, means for automatically engaging said swinging arm with said goosenecks, and means substantially as described, for keeping the end of said hollow arm under even pressure against said goosenecks, as specified.

8. In a pneumatic malting apparatus, means, substantially as described, for changing the duration of the sprinkling, in combination with a water-supply pipe and a swinging arm connecting said water-supply pipe with the sprinkling-pipe within the drum, as stated.

9. In a pneumatic malting apparatus, a revolving drum, an engaging pin on said drum, and means for intermittently connecting the water-supply with the sprinkling device, consisting of a series of notched, revolving disks, a ratchet-and-pawl device for intermittently revolving said disks, dogs engaging with said disks in the said notches, a swinging arm, a catch on said swinging arm, goosenecks on the head of said drum, and a suitable water-supply, as specified.

10. In a pneumatic malting apparatus, the device for changing the interval between the sprinklings and engaging and disconnecting the water-supply, consisting of an engaging pin on the head of the malting-drum, means for intermittently rotating a series of disks, a series of dogs journaled upon a suitable shaft, lifting-cams above said dogs, a lever on said shaft, a swinging arm, a catch thereon, and a connecting-rod connecting said catch with said lever, as and for the purpose stated.

11. In a pneumatic malting apparatus, the combination, with a revolving drum, sprinkling-pipes therein, a device for automatically opening and closing the supply-controlling valve, consisting of a quadrant, a curved opening therein, inclines in said curved opening, a dog in said opening, a slide carrying said dog, a swinging arm carrying said slide, a valve-casing on the end of said swinging arm, a valve in said casing, and suitable connection between said slide and valve, as stated.

12. In an automatically-operating, intermittently-acting sprinkling device for pneumatic malting-drums the device for timing the duration of the sprinkling, consisting, in combination with a quadrant having a curved opening therein, inclines in said curved opening, a pivoted cam-lever, an incline on said cam-lever by means of which the distance between the said inclines may be varied, by moving said lever, and a dog operating in said curved opening and connected with the controlling-valve, as stated.

13. In a device for automatically and intermittently sprinkling the contents of pneumatic malting-drums, the mechanism for automatically timing the duration of the sprinkling, consisting of a quadrant having a curved opening provided with an enlargement at its end, a hollow swinging arm, means for connecting said arm with the water-supply pipe, a valve-casing, a controlling-valve therein, a slide upon the face of the swinging arm connected with said valve, an oblong dog pivoted on said slide, the pivot being near one end of the oblong dog, an incline in said curved opening adapted to pull down said dog to open the valve, a movable incline adapted to engage the long end of the dog to throw the same over, as specified.

14. In a sprinkling device for pneumatic malting-drums the combination, with the water-supply pipe, of means for movably connecting the water-supply pipe with the hollow swinging arm, consisting of a T, a hollow link connected therewith on one end, a socket at the other end of said link, a pipe connected with said socket and a hollow swinging arm on the other end of said pipe, as specified.

15. In an automatically and intermittently operating sprinkling device for pneumatic malting-drums, the means for connecting and disconnecting the swinging arm from the goosenecks consisting, essentially, of a swinging arm, a catch on the upper end thereof, a connecting-rod connected at one end with said catch and a pivot at the other opposite end, said pivot being located below and to one side of the center of revolution of said swinging arm whereby said catch is projected from and retracted by the swinging of said arm, as described.

16. In an automatically and intermittently operating sprinkling device for pneumatic malting-drums, the means for keeping the swinging arm in contact with the goosenecks, consisting of said swinging arm, levers pivoted in suitable standards, a pipe connected with the swinging arm and passing through said levers, links on the ends of said levers, a U-shaped lever connected with said links, an arm on said U-shaped lever and a weight on said arm, as specified.

17. In an automatically and intermittently operating sprinkling device for pneumatic malting-drums the means for varying the limit of movement of the lever sustaining the swinging arm, consisting of a lever having a curved arm, a dog upon said arm to limit the downward movement of the arm, and a curved base such as the pipe B, to stop the downward movement of the dog, as stated.

18. In a device for changing the interval of sprinkling in pneumatic malting-drums, the combination, with a series of lifting-cams having handles as described and being journaled upon a shaft fixed within arms, as stated, a cross-bar, hinged to one of the said arms at one end, a lock at the other end, a stud in one of said arms having a notch wherewith engages the bolt of said lock, and lifting-cams having handles, as and for the object set forth.

19. In a pneumatic malting apparatus, the means for locking the cam-lever to the quadrant, consisting of a plate upon said quadrant and provided with indicating-marks, notches in the edge of said plate, a pivoted cam-lever, a lock at the end of said lever adapted to lock in said notches, an extension on said lever having an opening through which the said marks may be observed, as stated.

20. In a sprinkling device for pneumatic malting-drums, the device for actuating the curved lever, consisting of a notched disk, a dog, a lifting-cam, an oblong projection on said lifting-cam, a handle thereon, a shaft upon which said lifting-cam is journaled, arms receiving said shaft, a shaft to which said arms are affixed, and suitable standards to receive said shafts, as specified.

21. In a sprinkling device for pneumatic malting-drums the device for automatically actuating the curved lever consisting, essentially, of a notched, revolving disk, a dog, a projection on said dog adapted to engage with the notches in said disk, a shaft upon which the dog is journaled, a lever on the end of said shaft, and means for connecting said dog with said shaft, as and for the purpose stated.

22. In a sprinkling device for pneumatic malting-drums, the combination, with the dogs, of the lifting-cams, indicating-plates on said lifting-cams, and separating-plates between said dogs and adapted to cover the indicator-plates, as and for the object set forth.

In testimony that we claim the foregoing as our joint invention we have hereto set our hands in the presence of two subscribing witnesses.

WM. HEISER.
GEO. J. MEYER.

Attest:
MICHAEL J. STARK,
MICHAEL J. STARK, Jr.